United States Patent
Gail et al.

(10) Patent No.: US 6,352,263 B1
(45) Date of Patent: Mar. 5, 2002

(54) BRUSH SEALS WITH BRISTLES ARRANGED AT AN ANGLE

(75) Inventors: Alfons Gail, Friedberg; Stefan Beichl, Herrsching; Werner Klemens, München, all of (DE)

(73) Assignee: MTU Motoren-und Turbinen-Union, München (DE)

( * ) Notice: Subject to any disclaimer, the term of this patent is extended or adjusted under 35 U.S.C. 154(b) by 0 days.

(21) Appl. No.: 09/454,193

(22) Filed: Dec. 3, 1999

(30) Foreign Application Priority Data

Dec. 3, 1998 (DE) .......................... 198 55 742

(51) Int. Cl.[7] .......................... F16J 15/447
(52) U.S. Cl. .......................... 277/355
(58) Field of Search .......................... 277/355

(56) References Cited

U.S. PATENT DOCUMENTS 4,779,904 A * 10/1988 Rich .......................... 277/355
6,059,526 A * 5/2000 Mayr .......................... 277/355

FOREIGN PATENT DOCUMENTS

| DE | 383 6 474 | 6/1989 |
| DE | 196 13 510 | 4/1997 |
| DE | 196 18 475 | 11/1997 |

OTHER PUBLICATIONS

English Abstract 183 6 474.
English Abstract 196 13 510.
English Abstract 196 18 475.

* cited by examiner

*Primary Examiner*—Anthony Knight
*Assistant Examiner*—Enoch Peavey
(74) *Attorney, Agent, or Firm*—Schiff Hardin & Waite

(57) ABSTRACT

The invention relates to a brush seal 1 with bristles 3 arranged at an angle, for sealing a rotor (2) against a stator. The brush seal (1) has a support plate (9) with a longitudinal section (10) and a support section (11). The brush seal (1) also has bristles (3) with shaft sections (6) and bristle sections (7) arranged at an angle to the shaft sections (6). The end of the bristle sections (7) run against the sealing area (U) of the rotor (2). A bending clearance (13) is provided between the shaft sections (6) of the bristles (3) and the support plate (9). Between the bristle sections (7) and across the entire length of the support section (11) of the support plate (9) there is a gap (12) which closes if there is differential pressure on opposite sides of the bristles (3).

8 Claims, 3 Drawing Sheets

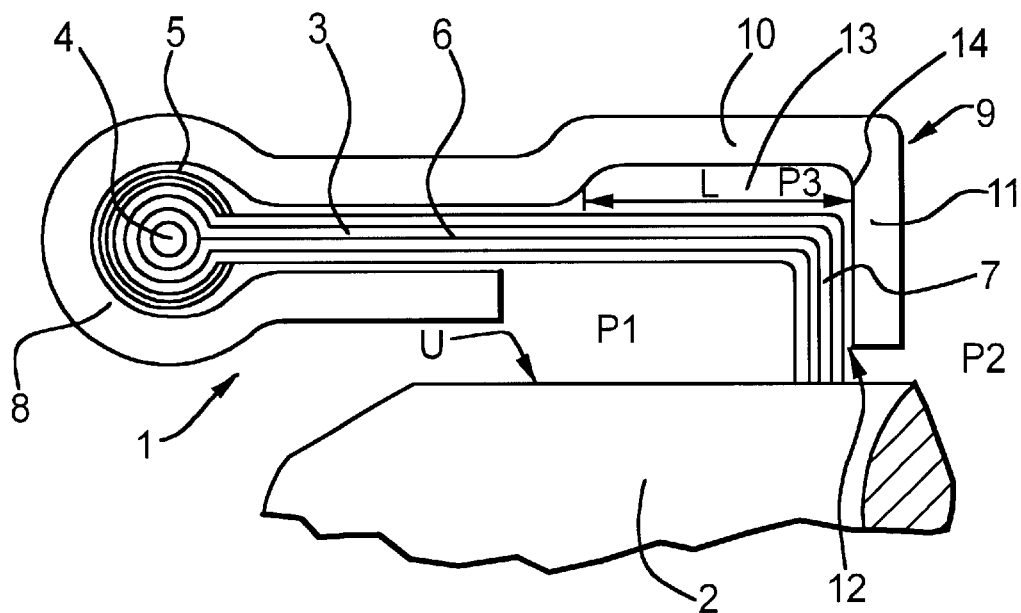

BRUSH SEALS WITH BRISTLES ARRANGED AT AN ANGLE

FIELD OF THE INVENTION

The present invention generally relates to brush seals with bristles arranged at an angle. The brush seals may be used for sealing a rotor against a stator in gas turbine engines, for example. More specifically, the present invention relates to brush seals which have a support plate with a longitudinal section and a support section arranged at an angle to the longitudinal section, and bristles with shaft sections and bristle sections arranged at an angle to the shaft sections, with the end of the bristle sections running against the sealing area of the rotor.

BACKGROUND OF THE INVENTION

Due to various advantages, the use of brush seals in gas turbines is well proven versus other seal designs, such as, for example, lip seals or labyrinth seals.

In German patent document no. 196 18 475 A1, a brush seal is known which has bristles that are arranged at an angle so as to reduce the radial length of the design. In order to keep the greater rigidity of the short bristle sections arranged at an angle, within desirable limits, a limit stop situated in the area of the shaft sections of the bristles has been provided. The limit stop acts as a bending edge if the elastic bristles are subjected to excursion due to rotor eccentricity. In this way, the rigidity of the bristles can be adjusted without requiring the design of an unduly large radial space.

However, leakage occurring with such existing brush seals has proven problematical. The leakage has included a primary leakage through an annular gap between the rotor and the bristle packet on the one hand, and a "bypass air quantity" leakage on the other hand, which streams across the bending clearance between the support plate and the bristle packet.

SUMMARY OF THE INVENTION

One object of the present invention is to provide improved brush seals with bristles arranged at an angle. It is desirable that an optimal sealing effect is achieved without the so-called "hang-up" effect occurring in which, in the event of a differential pressure, the bristle packet is pressed against the support plate and remains stuck to the support plate due to frictional force.

According to the invention, the object can be met in that between the shaft sections of the bristles and the support plate, a bending clearance is provided, and between the bristle sections arranged at an angle and across the entire length of the support section of the support plate there is a gap which closes if there is a differential pressure.

One advantage is that, with selection of the gap depending on the differential pressure, the pressure in the bending clearance corresponds to the pressure in front of the brush seal. This means that almost the entire decrease in pressure takes place via the bristle packet arranged at an angle, or the bristle sections arranged at an angle. In the case of pressure being present, the bristle packet is not brought to a constrained position such that it is pressed against the support section with substantial axial pressure, loses its elasticity, and after rotor excursion remains stuck in that position. During normal operation under pressure, i.e. constant operating conditions, the bristle sections arranged at an angle, at least in parts or sections, position themselves against the support section of the support plate while closing the gap.

Preferably, the gap is set such that there are no pressure loads or pressure tensions in the shaft sections of the bristles if there is a differential pressure. Instead, the differential pressure is absorbed as a tensile force in the shaft sections of the bristles. In this way, the pressure in the bending clearance corresponds to the higher pressure in front of the brush seal so that the shaft sections of the bristles do not experience any pressure load and in the case of a change of the pressure level, display a quasi-automatic restoring effect. In the case of a pressure reduction, the temporarily higher pressure in the bending clearance pushes the elastic bristles in the direction of the sealing area of the rotor, i.e. generally, radially towards the interior. Conversely, during an increase in pressure, the shaft sections of the elastic bristles are first lifted way from the sealing surface of the rotor, i.e. generally, radially to the exterior, until pressure compensation takes place.

Preferably, the bending clearance extends up to a rear edge of the longitudinal section of the support plate.

Alternatively, the object can be met in that the bristle sections arranged at an angle are positioned at an angle in the direction of rotation of the rotor, with the angle being between 0° and 70°, for example, between 40° and 50°.

By positioning the bristles in the direction of the rotor, the sealing effect is improved because the air streaming through the bristle packet is deflected by the bristles positioned at an angle. In this way the so-called "jet-through" flow configuration, i.e. channel formation between the row of bristles as it occurs with bristles not positioned at an angle, is avoided. Additionally, during rotor excursions, a large restoring force is generated by the torsion of the shaft sections of the bristles, practically eliminating any adhesion to the support plate, by the bristle sections arranged at an angle.

Preferably, a bending clearance is provided between the shaft sections of the bristles and the support plate, so that the restoring effect of the bristles in the case of changing pressures and excursions of the rotor is generated by concurrent bending and torsion.

Furthermore, it can be advantageous if the shaft sections of the bristles are longer than the bristle sections arranged at an angle, so that the bristle packet, having the restoring effect of the elastic bristles, does not become too rigid.

In an embodiment of the invention, a brush seal with bristles arranged at an angle for sealing a rotor against a stator has a support plate with a longitudinal section and a support section, and bristles with shaft sections and bristle sections arranged at an angle to the shaft sections. The ends of the bristle sections run against the sealing area of the rotor. Between the shaft sections of the bristles and the support plate a bending clearance is provided. Between the bristle sections arranged at an angle and across the entire length of the support section of the support plate there is a gap which closes if there is a differential pressure.

In an embodiment of the invention, the gap of the brush seal is adjusted such that there are no pressure loads in the shaft sections of the bristles if there is a differential pressure.

In an embodiment of the invention, the bending clearance of the brush seal extends to the rear edge of the longitudinal section of the support plate.

In an embodiment of the invention, a brush seal with bristles arranged in an angle for sealing a rotor against a stator has a support plate with a longitudinal section and a support section, and bristles with shaft sections and bristle sections arranged at an angle to the shaft sections. The ends of the bristle sections are lined against the sealing area of the rotor. The brush sections arranged at an angle are positioned at an angle towards the direction of rotation of the rotor.

In an embodiment of the invention, the angle of the brush seal is between 0° and 70°.

In an embodiment of the invention, a bending clearance is provided between the shaft sections of the bristles and the support plate.

In an embodiment of the invention, the shaft sections of the bristles are longer than the bristle sections arranged at an angle.

In an embodiment of the invention, the free ends of the bristles seal against a rotor positioned on the inside.

In an embodiment of the invention, the free ends of the bristles seal against a rotor positioned on the outside.

In an embodiment of the invention, the rotor has a cylindrical annular body.

Objects and advantages of the present invention will become apparent upon reading this disclosure including the appended claims with reference to the accompanying drawings. The objects and advantages may be desired, but are not necessarily required, to practice the present invention.

BRIEF DESCRIPTION OF THE DRAWINGS

FIG. 1 is a schematic sectional view of an embodiment of a brush seal according to the principles of the present invention.

FIG. 2 is a schematic sectional view of the brush seal of FIG. 1 with pressure being present, in which the brushes are in a state of excursion due to an increase in pressure or a rotor/housing excursion.

DETAILED DESCRIPTION OF PRESENTLY PREFERRED EMBODIMENTS

Figure 3:
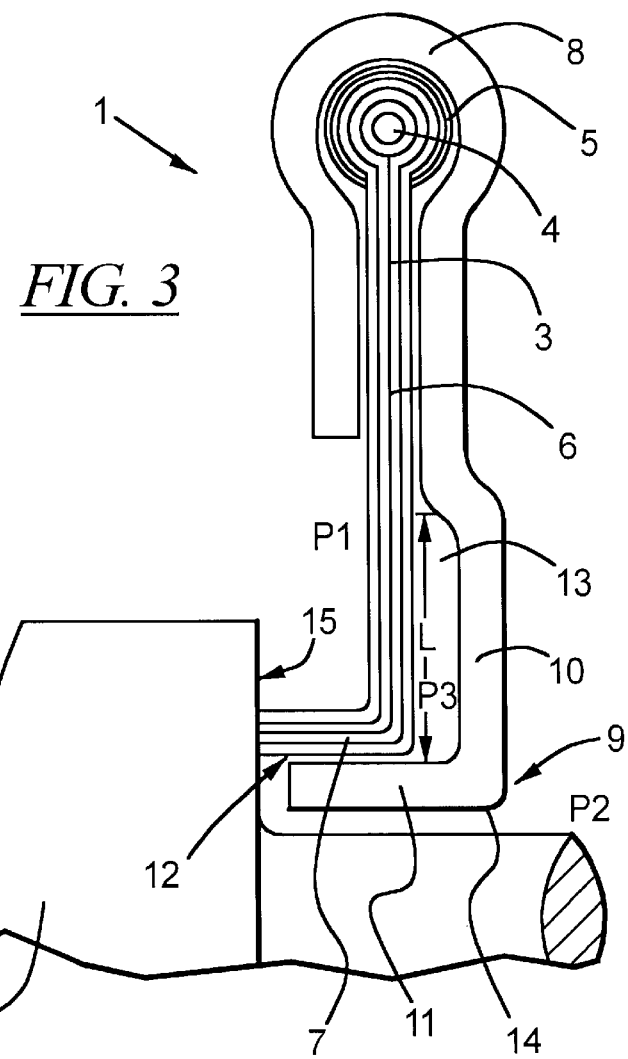
FIG. 3 is a schematic sectional view of an installed position of a further embodiment of a brush seal according to the principles of the present invention, with a rotor comprising a frontal sealing area.

Although the present invention can be made in many different forms, the presently preferred embodiments are described in this disclosure and shown in the attached drawings. This disclosure exemplifies the principles of the present invention and does not limit the broad aspects of the invention only to the illustrated embodiments.

FIG. 1 shows an embodiment of a brush seal 1, which seals two compartments of different pressures P1, P2 between a rotation-symmetric rotor 2, which has a circumferential area designated by the letter "U", and a stator (not shown), e.g. a housing of a gas turbine, such as an aircraft engine. The pressure P1 may exceed the pressure P2. In FIG. 1, the brush seal 1 is shown without pressure being present. The free ends of the bristles or the bristle packet 3 of the brush seal 1 run against the circumferential area U of the rotor 2. The bristles 3 are wound around a core 4 and are held or positioned in a retaining ring 5. The retention of the bristles 3 can take place in any other manner.

The bristle packet or the bristles 3 have shaft sections 6 and bristle sections 7, arranged at an angle to the shaft sections 6. In the installation position of FIG. 1, the shaft sections 6 of the bristles 3 extend in an axial direction of the gas turbine. The angle between the shaft sections 6 and the bristle sections 7 arranged at an angle is approximately 90°, so that the bristle sections 7 arranged at an angle are essentially positioned in one radial plane. The retaining ring 5 is positioned in a housing 8 of the brush seal 1. The housing 8 has a support pate 9 with a longitudinal section 10 essentially extending in the direction of the shaft section 6 of the bristles 3, and a support section 11 arranged at an angle to the longitudinal section 10. The shape of the housing 8, the support plate 9, and a front plate (not described in detail) have an influence on the function of the brush seal 1. They are configured depending on the particular application. Above the support section 11 of the support plate 9, the free ends of the bristle sections 7 arranged at an angle protrude so as to touch the circumferential area U of the rotor 2.

Between the bristles 3 and the support plate 9 a bending clearance 13 is provided. The bending clearance 13 extends to a rear edge 14 constituting the transition between the longitudinal section 10 and the support section 11 of the support plate 9. The shaft sections 6 of the bristles 3 can make an excursion into the bending clearance 13 so as to keep the stiffness of the comparatively short bristle sections 7 arranged at an angle within justifiable limits. Depending on the length L of the part subject to excursion of the shaft section, the bristles 3 are adjustable. Starting at the support section 11 of the support plate 9, the length L of the bending clearance 13 may extend further towards the retaining ring 5 of the bristles 3 than is shown in the present embodiment of FIG. 1.

In the brush seal 1, which has not yet been pressurized according to FIG. 1, a gap 12 exists between the bristle sections 7 arranged at an angle and the support section 11 of the support plate 9. Depending on the pressure difference to which the brush seal 1 is subjected during operation, the size of the gap 12 is set such that in the case of a pressure difference, the shaft sections 6 of the bristles 3 are not introducing any pressure in the shaft sections 6 and are not forced against the support section 11 or its interior surface.

By setting the size of the gap 12 between the bristle sections 7 arranged at an angle and the support section 11 of the support plate 9, the differential pressure present between the spaces P1 and P2 is taken up as a tensile force in the shaft sections 6 of the bristles 3. The gap 12 is reduced or closed after pressure is present. The pressure of the bristle sections 7 arranged at an angle acting against the support section 11 is comparatively low as a result of the tension load. From the point of a view of the sealing effect, this provides the advantage that the resulting frictional force between the bristles 3 of the support plate 9 is also low, and the bristles 3, after lateral excursion due to excursion of the rotor 2, do not remain stuck on the support section 11.

With essentially constant operating conditions, after pressure is present, a pressure equilibrium occurs between P1 and P3. This pressure equilibrium state (not shown) from the point of view of the arrangement of individual elements, is similar to that in FIG. 1 without pressure being present, except that the gap 12 between the bristle sections 7 arranged at an angle and the support section 11 of the support plate 9 is closed by the closely fitting bristles.

FIG. 2 shows a diagrammatic side view of a brush seal 1 where the bristles 3 are subject to excursion due to an increase in pressure in the space with higher pressure P1, or due to a shift in the rotor/housing 2. If the gap 12 between the bristles 3 and the support plate 9 is set optimally, the pressure P3 in the bending clearance 13 corresponds to the pressure P1 in the space with the higher pressure. This results in the shaft sections 6 of the bristles 3 remaining without a pressure load in the case of a pressure difference. Also, in the annular gap between the circumferential area U of the rotor 2 and the free ends of the bristles 3, through which primary leakage occurs, is automatically optimally set when the pressure difference changes.

In the case of a pressure increase in the space of higher pressure P1, as shown in FIG. 2, the temporarily still lower pressure P3 in the bending clearance 13 deflects the bristles 3 upward, i.e. in this case radially outward, until a pressure equilibrium results. In the converse case (not shown) of a decrease in pressure, due to the temporarily higher pressure P3 in the bending clearance 13, the bristles 3 are deflected downward, i.e. radially inward, thus, reducing the annular gap between the rotor 2 and the bristles 3 until a pressure equilibrium occurs. The setting of the gap 12 and the resulting compensation movements due to the restoring effect of the bristles 3 in the case of a change in pressure difference merely causes a comparatively "soft" brushing of the free ends of the bristles 3 against the circumferential area U of the rotor 2. Consequently, the service life of the brush seal 1 with bristles 3 arranged at an angle can be increased and the sealing effect can be improved. Furthermore, the restoring effect prevents any sticking of the bristles 3 or of the bristle sections 7 arranged at an angle, to the support section 11 of the support plate 9 at high differential pressures.

FIG. 3 shows another installation position of a brush seal 1, in which the longitudinal section 10 of the support plate 9 as well as the shaft sections 6 of the bristles 3 essentially extend in a radial plane of the gas turbine. The free ends of the bristle sections 7 arranged at an angle run against a radially aligned front sealing area 15 of the rotor 2. In this embodiment, the support section 11 of the support plate 9 and the bristle sections 7 arranged at an angle of the bristles 3 are essentially aligned in an axial direction of the gas turbine. The above mentioned pressure compensation movement of the bristles 3 as a result of the previously set extent of the gap 12 during a change in the pressure difference between the space of higher pressure P1 and the space of lower pressure P2 takes place in the same way.

The brush seal 1 with bristle sections 7 arranged at an angle in all its embodiments can be used in various installation positions. The brush seals are suitable for both stationary gas turbines and for aircraft engines, for example. Due to the bristle sections 7 arranged at an angle, which generally are essentially aligned in a radial direction, the brush seal 1 can be operated in both directions of rotation of the rotor 2.

Figure 4:
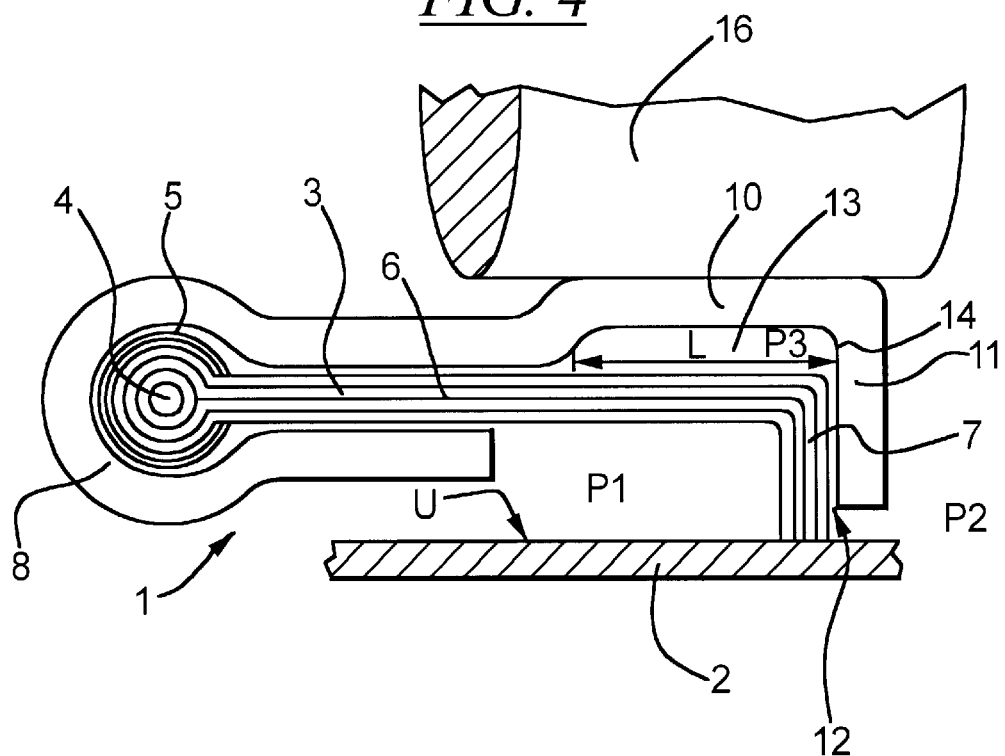
FIG. 4 is a schematic sectional view of an alternative installation position of a further embodiment of a brush seal according to the principles of the present invention, in which there is an exterior rotor.

FIG. 4 shows an alternative installation position of an embodiment of the brush seal 1 according to the invention. The brush seal 1 provides a seal against a circumferential area U' of a rotor 2 radially arranged on the exterior. The rotor may, for example, be a cylindrical ring component in the case of a roller. FIG. 4 shows the conditions without pressure being present. The brush seal 1 is arranged on a stator 16 positioned on the interior so that the bristle sections 7 arranged at an angle essentially extend outward in a radial direction. In the case of positioning of the bristle sections 7 arranged in the direction of rotation of the rotor, the bristle sections 7 may be at an angle of between 0° and 70° to the radial direction. The above described setting of the gap 12 occurs in a corresponding way.

Figure 5:
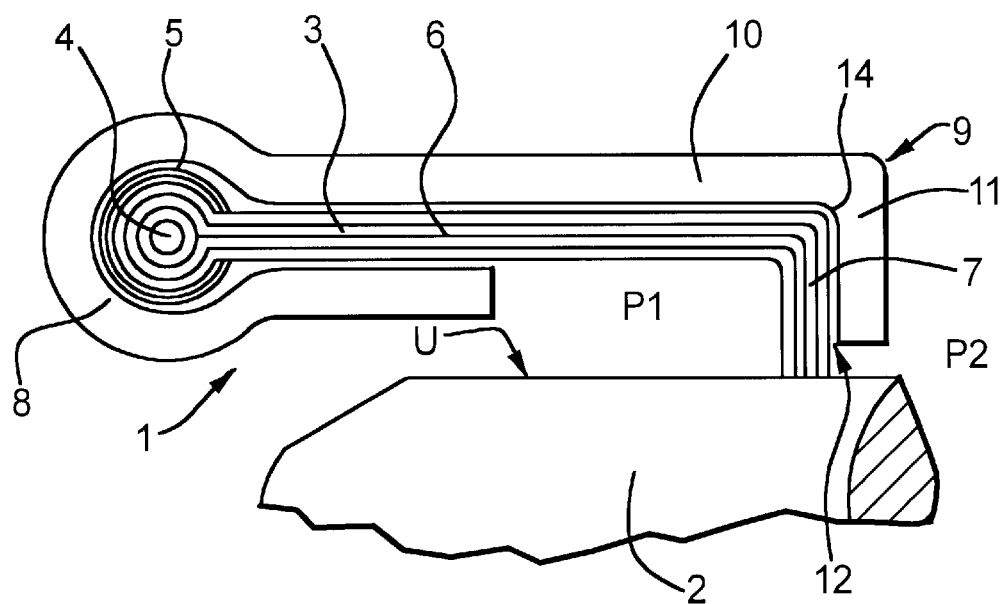
FIG. 5 is a schematic sectional view of a further alternative embodiment of a brush seal according to the principles of the present invention with bristle sections aligned in the direction of rotation of the rotor.

In the embodiment shown in FIG. 5 of the brush seal 1 according to the invention, the bristle sections 7 arranged at an angle are positioned at an angle of approximately 45° to the radial direction in the direction of rotation of the rotor. Consequently, in the case of excursion of the rotor 2, the shaft sections 6 of the bristles 3 are subjected to torsion, and so-called "channel formation" of the air streaming through the bristle packet 3 is prevented. At the same time an increased restoring force is generated due to the torsion so that the bristle sections 7 arranged at an angle return after the excursion instead of remaining stuck to the support section 11 of the support plate 9. Due to the effects described, a significant improvement of the sealing effectiveness of the brush seal 1 can be achieved.

Figure 6:
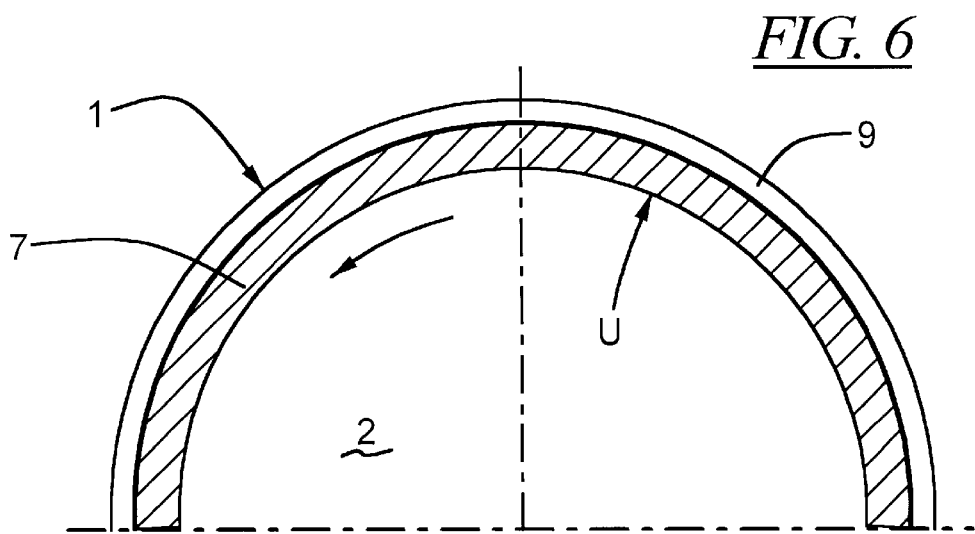
FIG. 6 is a schematic sectional front view of the brush seal of FIG. 5.

FIG. 6 shows a diagrammatic front sectional view showing half of the brush seal 1 according to the embodiment in FIG. 5. For improved clarity, the support section 11 of the support plate 9 has been omitted or is merely suggested. It is evident that the bristle sections 7 arranged at an angle are positioned at an angle of approximately 45° in the direction of the rotation of the rotor 2, which is indicated by an arrow. During an excursion of the rotor 2, the bristle sections 7 arranged at an angle lift under torsion of the shaft sections 6. This measure prevents the channel formation described above. In addition, the torsion brings about a large restoring effect.

In a further embodiment (not shown) of the brush seal 1, the bristle sections 7 arranged at an angle can be positioned at another angle of 0° to 70° in relation to the radial direction in the direction of rotation of the rotor. With such positioning, the shaft sections 6 of the bristles 3 are subjected to torsion during radial deflection of the bristle sections 7, e.g. due to excursion of the rotor 2. In this way, the shaft sections 6 of the bristles 3 generate a considerable restoring force so that the bristle sections 7 arranged at an angle do not remain stuck to the support section 11 of the support plate 9. Thus, negative affects of the sealing action is avoided. The embodiment of the brush seal 1 with positioned bristle sections 7 arranged at an angle can be either with or without the bending clearance 13. In the case of an embodiment with the bending clearance 13, during excursion of the rotor 2, concurrent bending and torsion of the shaft sections 6 of the bristles 3 may occur.

While the presently preferred embodiments have been illustrated and described, numerous changes and modifications can be made without significantly departing from the spirit and scope of this invention. Therefore, the inventors intend that such changes and modifications are covered by the appended claims.

The invention is claimed as:

1. A brush seal for sealing against a rotor having a sealing area comprising:

bristles having shaft sections and bristle sections arranged at an angle to the shaft sections, the bristle sections having a length with ends adapted to contact the sealing area of the rotor;

a support plate having a longitudinal section extending along the shaft sections and a support section extending at an angle from the longitudinal section and having a length less than the length of the bristle section so that an edge of the support section is spaced from the ends of the bristle section;

a bristle bending clearance between the shaft sections of the bristles and the support plate; and a gap between the bristle sections of the bristles and the entire length of the support section of the support plate, the bristle sections being moveable into the gap and into contact with the edge by a pressure differential on opposite sides of the bristles.

2. A brush seal according to claim 1, wherein the bristle bending clearance extends to a rear edge of the longitudinal section of the support plate.

3. A brush seal according to claim 1, wherein the bristle sections of the bristle are positioned at an angle between 0° and 70° toward a direction of rotation of the rotor so that during a radial movement of the rotor toward the ends of the bristle sections the shaft sections are placed in torsion.

4. A brush seal for sealing against a rotor having a sealing area, the rotor having a direction of rotation, comprising:

bristles having shaft sections and bristle sections arranged at an angle to the shaft sections, the bristle sections having ends adapted to be aligned against the sealing area of the rotor; and a support plate having a longitudinal section and a support section extending from the longitudinal section;

the bristle sections of the bristles being positioned at an angle of between 0° and 70° toward the direction of rotation of the rotor so that with a rotor excursion against the ends of the bristles, the shaft sections are placed in torsion.

5. A brush seal according to claim 4, wherein the angle is between 40° and 50°.

6. A brush seal according to claim 5, which includes a gap between the entire length of the support section and the bristle sections of the bristle, so that when a pressure differential is applied on opposite sides of the bristles, the bristle sections move to close the gap.

7. A method for sealing a brush seal against a rotor comprising the steps of:

providing bristles having shaft sections and bristle sections at an angle relative to the shaft sections;

positioning a support plate having a longitudinal section and a support section adjacent the bristles;

positioning the bristle sections of the bristles at an angle of 0° to 70° toward a direction of rotation of the rotor; and sealing the bristle sections against the rotor.

8. A method according to claim 7, wherein the angle is between 40° and 50°.

* * * * *